Aug. 12, 1958     H. M. BUSEY     2,847,284
APPARATUS FOR CATALYTICALLY COMBINING GASES
Filed March 10, 1955
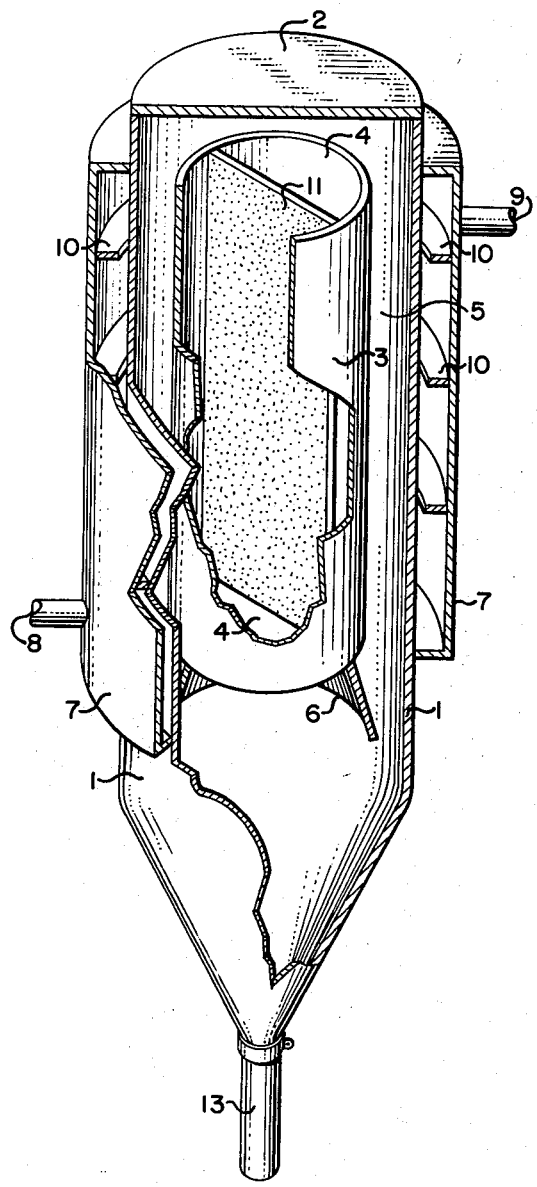
WITNESSES
INVENTOR.
HAROLD M. BUSEY
BY

United States Patent Office 2,847,284
Patented Aug. 12, 1958

2,847,284

APPARATUS FOR CATALYTICALLY COMBINING GASES

Harold M. Busey, Los Alamos, N. Mex., assignor to the United States of America as represented by the United States Atomic Energy Commission Application March 10, 1955, Serial No. 493,579

3 Claims. (Cl. 23—288)

The present invention relates to methods and apparatus for catalytically combining gases and more particularly to combiners wherein the heat liberated during gas combination is utilized to circulate the gases.

The present invention is particularly useful in recombining gases liberated from the radiolytic decomposition of the moderator of a water-moderated nuclear reactor. Prior art systems for the recombination of such gases have required extensive temperature control and forced circulation systems. The present invention dispenses with the need for both of these prior art systems, and has the further advantage of having the circulation of gas dependent upon the amount of gas available for recombination. Furthermore, the radiolytically dissociated moderator results in a highly explosive gas, and reliance on mechanical circulating means in recombining this gas may be extremely hazardous.

The fact that no mechanical breakdown can occur in the recombiner of the present invention means that the frequency of exposure of personnel to radioactive hazards would thereby be reduced. Furthermore, in the present invention the entire interior portion of the recombiner may easily be removed, since all internal parts are suspended from the top plate. As a result, the recombiner catalyst may be replaced in a very short time by providing several internal assemblies for use.

Because of the inexpensive construction, several internal units of this type can easily be provided. In this manner no extended shut-down is required to replace the catalyst, and the residual radioactivity of the recombiner is no problem.

Another advantage of the present invention is that it can be incorporated into the same pressure vessel as a nuclear reactor thereby dispensing with the danger and expense of handling the hot, radioactive, explosive gases liberated by the nuclear reaction taking place. Such a utilization of the present invention is described in more detail in the copending application S. N. 500,710, filed April 11, 1955, of Harold M. Busey and R. Philip Hammond, entitled Research Reactor.

It is therefore an object of the present invention to provide a method and apparatus for circulating gases through a combiner by means of convection currents.

Another object of the present invention is to provide a method and apparatus for convection circulation of gas wherein the circulation rate is proportional to the amount of gas available for the combining process.

A still further object of the present invention is to provide a method and apparatus for circulating a gas over a catalytic agent by a convection current created in combining and condensing the gases, which is particularly useful in recombining the gases liberated by the radiolytic decomposition of the water-moderator of a nuclear reactor.

Other objects and advantages will become more apparent from the following description and drawing, hereby made a part of this specification, wherein the drawing shows one embodiment in accordance with the present invention.

The preferred embodiment shown in the drawing comprises a vertically disposed vessel 1 sealed at the top by means of removable plate 2. Suspended and spaced from the top plate 2 is a dividing chamney 3 coaxial with the walls of chamber 1 and spaced therefrom so that two passages or channels are formed, i. e., one through the interior of the chimney 3 indicated at 4, and the second between the outer surface of chimney 3 and the inner surface of vessel 1 indicated at 5. The chimney 3 is supported from the top plate 2 in any conventional manner which does unduly restrict the flow of gas between channel 4 and channel 5 at the upper ends.

Gas directing baffles 6 may be attached to and spaced from the lower end of chimney 3 to deflect the gas toward the interior channel 4 and to prevent the collection of solids on the catalyst surface.

The vessel 1 is surrounded by a cooling jacket 7 having a coolant inlet 8 and coolant outlet 9. Located within the coolant jacket 7 is a series of baffles 10 arranged to direct the coolant flow along the outer surface of vessel 1 to maximize the cooling effect in the channel 5.

Located inside the chimney 3 is at least one vertically disposed catalyst support 11, for example a coarse screen, to which the catalyst for combining the gases is attached. In this manner the channels 4 and 5, as well as the passage between these two channels above the chimney 3, are free-flowing channels since the flow of gas is not obstructed in channel 4 by the catalyst planes and the flow of vapor and gases is not obstructed by condensing apparatus in the channel 5. The catalyst, preferably in the form of pellets, may be distributed over the support 11 in any desired manner. However, it has been found that faster convection circulation is obtained if more of the catalyst is placed near the bottom of the catalyst support 11, i. e., in the lower portion of chimney 3, since the convection rate is dependent upon the height of the hot gas column.

The preferred catalyst consists of platinum-on-alumina pellets with dimensions of 3 mm. by 3 mm., and having 0.3 percent platinum by weight. The number of pellets required depends upon the amount of gas present. It has been found that one catalyst pellet is required to combine one milliliter of hydrogen per minute with oxygen at 20° C. start up temperature. With 5000 pellets displaced on the catalyst sheet or screen, and a flow of 5.0 liters of hydrogen per minute, the residual hydrogen is less than one per cent. However, for safety purposes the amount of catalyst should exceed the minimum requirements by a wide margin. Furthermore, the exact percentage of platinum may vary over a wide range, and its value for the specific operating conditions present is determined by routine experiments conducted in accordance with the teachings of the art.

For the specific embodiment being described the catalyst pellets were attached to both sides of the catalyst screen support 11 by means of ceramic cement. However, one or more rods (not shown) with catalyst pellets cemented to the surface can be used instead of a screen support. The number of catalyst pellets required is determined by the amount of gas to be combined. Further, although pellets have been used in the embodiments described, other forms of catalyst may be used; the primary consideration being the relation between the surface area of the catalyst over which the gas may pass and the amount of gas to be combined.

The gas inlet is shown at 13. This inlet is located below the chimney 3, so that the gas will flow into channel 4. The inlet 13 may also serve as an outlet for the condensed gases. In this manner the input pressure of the gas may be of any desired value, since the convection current will circulate the gas to be combined over the catalyst sheet 11 at any desired working pressure.

The operation of the device is as follows. The gases to be catalytically combined are admitted through one or more inlets 13. The baffles 6 direct these gases into channel 4 where the gases pass over the catalyst pellets on the catalyst support 11. As the gases pass over the catalyst, the hydrogen is combined with oxygen to form water. In combining the gases, heat is liberated. This heat rises to the top of channel 4 carrying the combined gases with it, the chimney 4 acting as a hot leg of a convection current. The combined gases then flow over the top of chimney 3 into channel 5. As they flow down the passage 5, the combined gases are condensed to water by the cooling action of the water in jacket 7, so that the channel 5 acts as the cold leg of the convection current. The condensed gases fall to the bottom of the combiner chamber and pass out the opening 13 as a liquid. Further, it is apparent that the unrecombined gases which flow down channel 5 will be recirculated up chimney 3 and over the catalyst 11 until complete recombination occurs, since there is no outlet for uncombined gases from the vessel 1.

Thus, it can be seen that, the circulation rate is dependent upon the amount of heat liberated, the amount of heat liberated is a function of the quantity of gases combined, and the quantity of gases combined is dependent upon the amount of gas available. In this manner, the circulation rate is proportional to the amount of gases combined. Therefore, if sufficient catalyst is present, fluctuations in the flow of the input gases are automatically compensated for. It has been found that the convection circulation rate is approximately two feet per second, when 5 liters per minute of hydrogen are being combined with oxygen. See Chemical Engineering Progress Symposium Series (American Institute of Chemical Engineers), No. 13, vol. 50, pages 27 to 38 (1954), which is hereby incorporated by reference into this disclosure.

Therefore, the present invention provides a novel combiner unit wherein no mechanical pumps, blowers or other mechanical circulating means are required. Such a device is especially useful in recombining gases liberated by the radiolytic decomposition of the water moderator of a nuclear reactor. The fact that there are no moving parts makes the present invention peculiarly adaptable for use with a water moderated nuclear reactor.

Although the preferred embodiment has been described as particularly useful in recombining hydrogen and oxygen liberated in the radiolytic dissociation of the water moderator of a nuclear reactor, it is apparent that the disclosed method and apparatus could be used for the combining of other gases. Further the present invention is particularly useful in combining gases where mechanical circulation is not desired, such as, for example, chemical reactions involving toxic and corrosive chemicals, because no pressure or corrosion proof seals are required in the present invention for the circulating apparatus. Therefore, it is understood that various modifications of the preferred embodiment may be made without departing from the scope of the invention as defined in the appended claims.

What is claimed is:

1. An apparatus for combining oxygen and hydrogen gases consisting of a closed vessel, means in the bottom of said vessel for admitting oxygen and hydrogen gases into said vessel and for collecting condensed vapor from said vessel, a vertical chimney supported within the upper portion of said vessel and spaced from the top and sides of said vessel, a flow directing baffle supported below said chimney for directing said gases into said chimney, at least one catalyst supporting member vertically disposed within said chimney, said catalyst supporting member supporting a catalyst for combining said oxygen and hydrogen gases to form water vapor, said catalyst being distributed over said catalyst supporting member with a majority of said catalyst located on the lower portion of said catalyst supporting member, and coolant means surrounding said vessel adjacent said chimney for cooling said gas and vapor between said vessel and said chimney.

2. An apparatus for combining oxygen and hydrogen gases consisting of a closed vessel having an imperforate top, a vertically disposed channel-forming member supported within the upper portion of said vessel and spaced from the top and sides of said vessel, at least one catalyst supporting member disposed in said channel within said vertical member, means defining a single aperture in the bottom of said vessel for admitting oxygen and hydrogen gases into the bottom of said channel and for collecting condensed vapor from said vessel, said catalyst supporting member supporting a plurality of catalyst pellets and means for cooling the annular volume between said closed vessel and said vertically disposed member.

3. An apparatus for combining oxygen and hydrogen gases consisting of a closed vessel, means defining a single aperture in the bottom of said vessel for admitting said gases into said vessel and for collecting condensed vapor from said vessel, a vertical chimney within the upper portion of said vessel and spaced from the top and sides of said vessel, at least one catalyst supporting member disposed in said channel within said chimney, said catalyst supporting member supporting a plurality of catalyst pellets, said catalyst pellets being distributed on said support with a majority of said pellets located in the lower portion of said chimney, and means for cooling the gases and vapor in the annular volume between said chimney and said vessel.

References Cited in the file of this patent

UNITED STATES PATENTS

| 2,029,604 | Bayer et al. | Feb. 4, 1936 |
| 2,443,817 | Draeger | June 22, 1948 |
| 2,462,193 | Hulsberg | Feb. 22, 1949 |
| 2,491,618 | Luetzelschwab | Dec. 20, 1949 |
| 2,704,702 | Pike | Mar. 22, 1955 |

OTHER REFERENCES

Beck et al.: U. S. Atomic Energy Comm., ORO 33, July 5, 1950, pages 16–33, 43–47, 68, 74.

Beall et al.: Chemical and Engineering Progress, vol. 50, No. 5, pages 256–262, May 1954.

L. A. 1337: Los Alamos Scientific Laboratory of the U. of California (associated with U. S. Atomic Energy Comm.), March 6, 1952, pages 2–15, 17 18 19, 20 and 23.